(12) United States Patent
Yang et al.

(10) Patent No.: US 10,742,053 B2
(45) Date of Patent: Aug. 11, 2020

(54) POWER TOOL

(71) Applicant: Nanjing Chervon Industry Co., Ltd., Nanjing (CN)

(72) Inventors: Dezhong Yang, Nanjing (CN); Haiyan Li, Nanjing (CN); Weipeng Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/186,887

(22) Filed: Nov. 12, 2018

(65) Prior Publication Data
US 2019/0207403 A1 Jul. 4, 2019

(30) Foreign Application Priority Data

Dec. 28, 2017 (CN) .......................... 2017 1 1455996

(51) Int. Cl.
*H02J 7/00* (2006.01)
*F04D 27/00* (2006.01)
*H02J 7/34* (2006.01)

(52) U.S. Cl.
CPC .......... *H02J 7/0068* (2013.01); *F04D 27/008* (2013.01); *H02J 7/345* (2013.01)

(58) Field of Classification Search
CPC ........ H02J 7/0068; H02J 7/345; F04D 27/008
See application file for complete search history.

(56) References Cited

U.S. PATENT DOCUMENTS

2019/0052148 A1* 2/2019 Rahnamaee ........... H02K 11/33

* cited by examiner

*Primary Examiner* — Carlos Amaya
(74) *Attorney, Agent, or Firm* — Greenberg Traurig, LLP

(57) ABSTRACT

A power tool includes a power connection terminal, a power system, a main control switch, and a power supply protection circuit. A power supply path is disposed between the power connection terminal and the power system. The main control switch and the power supply protection circuit are configured to control the power supply path to be completed or broken. During the use of the tool, the power tool is not restarted if the main control switch is turned on before an external power source that meets a power supply requirement is connected.

5 Claims, 3 Drawing Sheets

POWER TOOL

RELATED APPLICATION INFORMATION

This application claims the benefit of CN 201711455996.5, filed Dec. 28, 2017, the disclosure of which is incorporated herein by reference in its entirety.

BACKGROUND

The following generally relates to a power tool and, more specifically, to a power tool that can avoid direct restart when the power tool is powered up after a power interruption occurs.

Generally, during the use of a power tool, the power tool needs to be connected to a battery pack and a switch needs to be closed before it is allowed to start the power tool. For some power tools such as a blower, to facilitate use, a LOCK_ON switch is usually provided. The switch may be triggered once to stay in a closed state, and does not need to be continuously triggered by an operator. During the use of the tool, if the power tool stops working due to a power interruption when the charge of the battery pack is excessively low or other cases such as a sudden interruption of a power supply, the operator can easily forget to open the LOCK_ON switch. The tool will thus immediately start after the power supply is connected again. A blower is used as an example. An operator may be not holding the tool tightly when the power supply is connected again. As a result, strong wind pressure produced by the blower causes discomfort to the operator or another person. Alternatively, when the tool is placed somewhere and is started suddenly, nearby objects can be affected and noise is produced in the environment.

SUMMARY

To resolve the deficiencies in the prior art, an objective of the subject disclosure is to provide a power tool that can avoid direct restart when the power tool is powered up after a power interruption occurs.

To achieve the foregoing objective, the subject disclosure describes an example technical solution in the form of a power tool including a power connection terminal, used for connection to an external power source, a power system, a power supply path being disposed between the power system and a power supply interface to enable the external power source to supply power to the power system, and a main control switch, disposed on the power supply path between the power system and the power supply interface, where the power supply path is completed only when the main control switch is in an on state.

The example power tool further includes a power supply protection circuit, connected to the power supply path, and configured to break the power supply path between the power system and the power supply interface when the power tool is used according to a protection operation order, where the protection operation order includes turning on the main control switch first and then connecting an external power source that meets a power supply requirement.

An example power supply protection circuit includes a power supply switch, disposed on the power supply path between the power system and the power supply interface, where the power supply path is completed only when the power supply switch is in an on state, a power supply start circuit, capable of sending to the power supply switch, a first control signal for controlling the power supply switch to be turned on, a blocking switch, capable of blocking the first control signal when turned on, and a power supply blocking circuit, configured to send to the blocking switch when the power tool is used according to a first operation order, a second control signal for controlling the blocking switch to be turned on.

An example power supply blocking circuit includes a first capacitor. The first capacitor is connected to the power connection terminal and has a charging process when the power tool is used according to the protection operation order. The first capacitor sends to the blocking switch in the charging process the second control signal for controlling the blocking switch to be turned on.

An example power supply blocking circuit further includes a first discharge branch, and the first capacitor and the first discharge branch are connected when the main control switch is closed.

An example power supply start circuit includes a second capacitor. The second capacitor is connected to the power connection terminal when the main control switch is closed. The second capacitor sends to the power supply switch in the charging process the first control signal for controlling the power supply switch to be turned on.

In an example, a first terminal of the second capacitor is connected to the main control switch, a second terminal of the second capacitor is on one hand connected to a control terminal of the power supply switch and, on the other hand, connected to a first terminal of the blocking switch, a second terminal of the blocking switch is connected to a reference level, the first terminal and the second terminal of the blocking switch are connected when the blocking switch is turned on, and a control terminal of the blocking switch is connected to the power supply blocking circuit.

An example blocking switch includes a first bipolar transistor. The control terminal of the blocking switch is connected to a base of the first bipolar transistor, a first terminal of a first blocking switch is connected to a collector of the first bipolar transistor, and a second terminal of the first blocking switch is connected to an emitter of the first bipolar transistor.

An example power supply switch includes a second bipolar transistor and a third bipolar transistor. The control terminal of the power supply switch is connected to a base of the second diode, an emitter of the second diode is connected to the reference level, the base of the second diode is connected to a base of the third bipolar transistor, and an emitter and a collector of the third bipolar transistor are disposed on the power supply path between the power system and the power supply interface.

In an example operation, a charging duration of the first capacitor is longer than a charging duration of the second capacitor.

An example power supply start circuit also includes a second discharge branch.

It should be noted that within the examples described herein, the connections include direct connections or indirect connections.

An example benefit of the described technical solution is that a main control switch and a power supply protection circuit are configured to control a power supply path between an external power source and a power system to be completed or broken. During the use of the tool, the power tool is not restarted if the main control switch is turned on before an external power source that meets a power supply requirement is connected.

DETAILED DESCRIPTION

Figure 1:
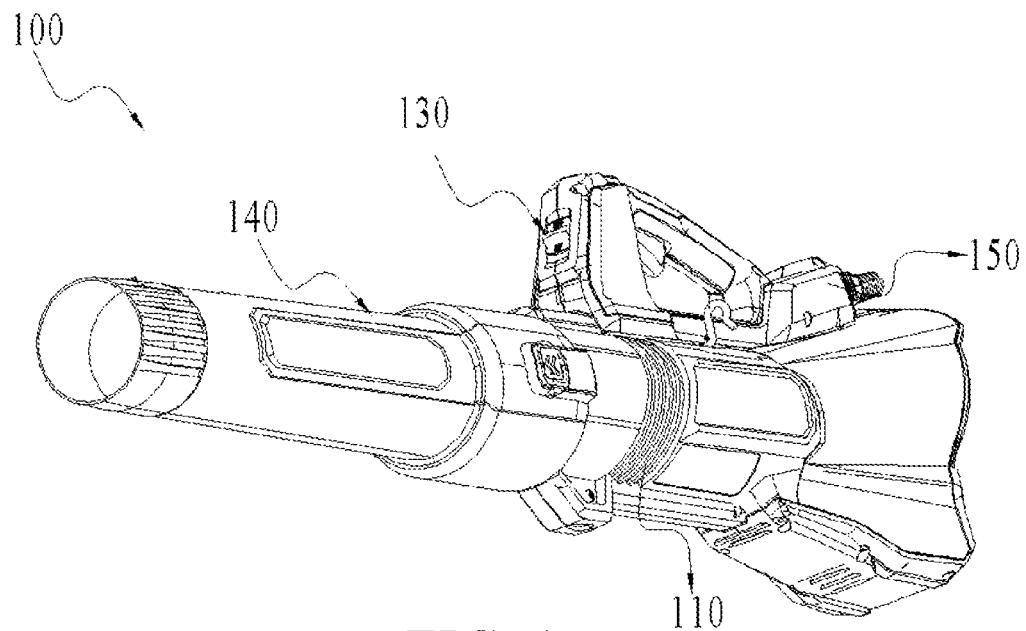
FIG. 1 is a three-dimensional diagram of an example blower.
Figure 2:
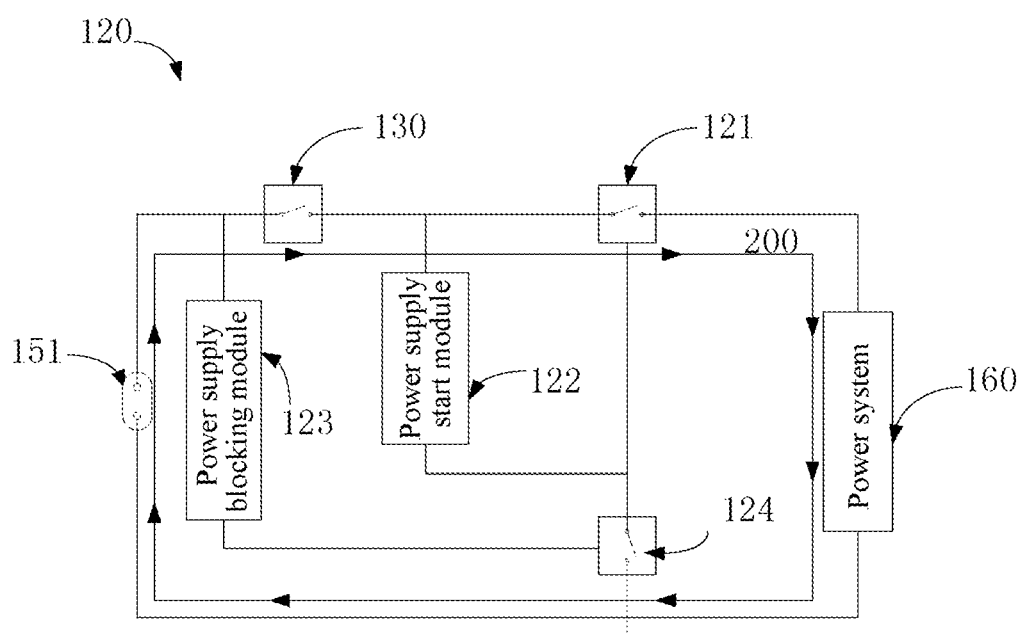
FIG. 2 is a schematic diagram of example circuits of the blower in FIG. 1.

With reference to FIG. 1 and FIG. 2, an example power tool, in the form of a blower 100 includes a housing 110. A main control switch 130 is disposed on a handle of the housing 110. A blow tube 140 is disposed at one end portion of the housing 110, and a power supply interface 150 is disposed at the other end portion of the housing 110. A power system 160 that provides power to the blow tube 140 is disposed inside the housing 110. The power system 160 includes a motor and a main control board configured to control the motor. A power supply protection circuit 120 is further disposed inside the housing 110. The main control switch 130 and the power supply protection circuit 120 are configured to control a power supply status of an external power source for the power system 160. The main control switch 130 may use a toggle switch or a slide switch or a rotary switch and includes an off state and an on state. The power tool may alternatively be an angle grinder, a circular saw, or other tool known in the art having a LOCK_ON switch. The power supply interface 150 may be a slide or plug battery pack interface, or may be used for connection to a USB interface of another portable power supply such as a power station.

As shown in FIG. 2, the power supply interface 150 includes a power connection terminal 151. A power supply path 200 is disposed between the power input terminal 151 and the power system 160. For example, the external power source is a battery pack. When the battery pack is connected to the housing 110 through the power supply interface 150, positive and negative electrodes of the battery pack are connected to the power supply path 200 through the power connection terminal 151 to supply power to the power system 160. The main control switch 130 is disposed on the power supply path 200, and the power supply path 200 can be completed only when the main control switch 130 is closed.

The power supply protection circuit 120 in FIG. 2 includes a power supply switch 121. The power supply switch 121 is disposed on the power supply path 200 between the power input terminal 151 and the power system 160. The power supply path 200 can be completed only when the power supply switch 121 is turned on. During normal start, the battery pack is connected to the housing 110 of the blower 100 through the power supply interface 150. An operator pushes the main control switch 130 to an on state. The power supply switch 121 is closed. The power supply path 200 is completed. The power system 160 and the battery pack are connected to provide power to the blow tube 140. The blower 100 starts to work. During use, if the charge of the battery pack is insufficient and as a result the battery pack cannot provide an electrical signal to the power system 160, the blower 100 can no longer work even if the power supply path 200 is completed. The operator forgets very easily to push the main control switch 130 to an off state. If the battery pack is replaced in this state, the battery pack may provide an electrical signal to the power system 160 again and the blower 100 is restarted. At this time, the operator is very likely not holding the blower 100 tightly. As a result, strong wind pressure produced by the blower may cause discomfort to the operator or another person.

To resolve the foregoing problem, in an implementation, the power supply protection circuit 120 in FIG. 2 further includes a power supply start circuit 122, a power supply blocking circuit 123, and a blocking switch 124. The power supply start circuit 122 can send, to the power supply switch 121, a first control signal for controlling the power supply switch 121 to be turned on. The blocking switch 124 can block the first control signal when being turned on. The power supply blocking circuit 123 sends to the blocking switch when a power tool is used according to a protection operation order of turning on the main control switch 130 first and then connecting an external power source that meets a power supply requirement a second control signal for controlling the blocking switch to be turned on. Specifically, a first terminal of the power supply switch 121 and a first terminal of the power supply start circuit 122 are separately connected to a first terminal of the main control switch 130. A second terminal of the main control switch 130 is connected to a first terminal of the power connection terminal 151. A second terminal of the power connection terminal 151 is connected to a reference level. A second terminal of the power supply switch 121 is connected to an output terminal of the power supply protection circuit 120. The output terminal is connected to the power system 160. A control terminal of the power supply switch 121 is connected to a second terminal of the power supply start circuit 122. A first terminal of the power supply blocking circuit 123 is connected between the second terminal of the main control switch 130 and the first terminal of the power connection terminal 151. A second terminal of the power supply blocking circuit 123 is connected to a control terminal of the blocking switch 124. A first terminal of the blocking switch 124 is connected to the second terminal of the power supply start circuit 122. A second terminal of the blocking switch 124 is connected to the reference level.

Figure 3:
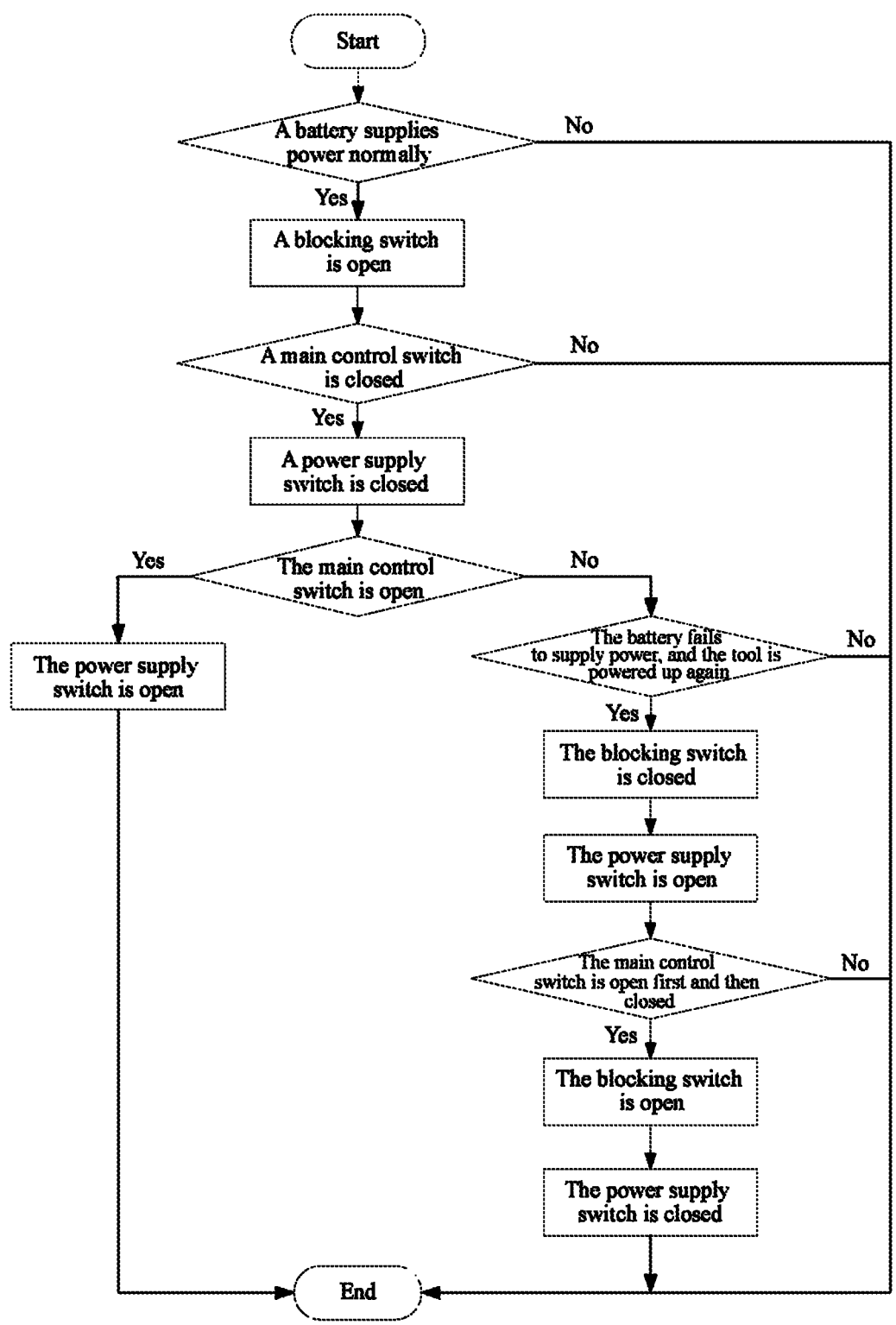
FIG. 3 is a working flowchart of an example power supply protection circuit in FIG. 2.

As shown in FIG. 3, during normal start, the battery pack is connected to the power connection terminal 151. The battery pack supplies power normally. The power supply blocking circuit 123 is connected to a power supply to control the blocking switch 124 to be in an open state. In this case, if an operator switches the main control switch 130 from an off state to an on state, the power supply start circuit 122 and the first terminal of the power supply switch 121 are connected to the power supply. The power supply start circuit 122 is connected to the power supply to control the power supply switch 121 to be turned on. The first terminal and the second terminal of the power supply switch 121 are connected, the power supply path 200 is completed, and the battery pack supplies power to the power system 160. In this case, if the operator switches the main control switch 130 from an on state to an off state, the power supply path 200 is broken, and the battery pack cannot supply power to the power system 160. It is assumed that the main control switch 130 is in an on state, and the battery pack can no longer supply power due to insufficient charge. In this case, the battery pack is replaced without switching the main control switch 130 to an off state, that is, the main control switch 130 is turned on before an external power source that meets a power supply requirement is connected, and the power supply protection circuit 120 is powered up again. The power supply blocking circuit 123 is connected to the power supply again and controls the blocking switch 124 to be in a closed state. The power supply start circuit 122 is connected to the reference level via the blocking switch 124, so that a connection between the power supply start circuit 122 and the power supply switch 121 is short-circuited. The power supply start circuit 122 cannot send, to the power supply switch 121, an electrical signal for turning on the power supply switch 121, the power supply path 200 is not completed, and the battery pack cannot supply power to the power system 160, so that a protection effect is achieved. In this case, if the main control switch 130 is switched from an on state to an off state and then to an on state again, the power supply blocking circuit 123 controls the blocking switch 124 to be in an open state. The power supply start circuit 122 may send, to the power supply switch 121 again, a signal for controlling the power supply switch 121 to be turned on. The power supply path 200 is completed.

Each of the power supply switch 121 and the blocking switch 124 may be a relay, a field effect transistor or a thyristor.

Figure 4:
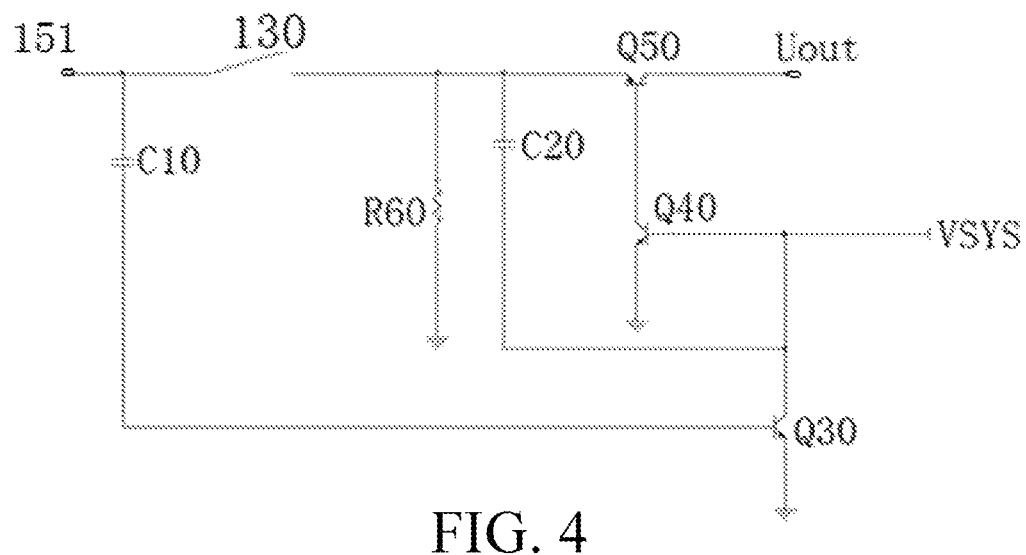
FIG. 4 shows an implementation of an example power supply protection circuit in FIG. 2.

In an implementation, with reference to FIG. 2 and FIG. 4, in the power supply protection circuit 120, the power supply start circuit 122 includes a capacitor C20, the power supply switch 121 includes an NPN bipolar transistor Q40 and a PNP bipolar transistor Q50, the power supply blocking circuit 123 includes a capacitor C10, and the blocking switch 124 includes an NPN bipolar transistor Q30. Charging duration of the capacitor C20 is shorter than charging duration of the capacitor C10. A first terminal of the capacitor C20 is connected to the first terminal of the main control switch 130. A second terminal of the capacitor C20 is connected to a base of the bipolar transistor Q40 and a collector of the bipolar transistor Q30. An emitter of the bipolar transistor Q30 is connected to the reference level. A base of the bipolar transistor Q30 is connected to a second terminal of the capacitor C10. A first terminal of the capacitor C10 is connected between the power connection terminal 151 and the second terminal of the main control switch 130. The first terminal of the main control switch 130 is connected to the reference level through a resistor R60. An emitter of the bipolar transistor Q40 is connected to the reference level. A collector of the bipolar transistor Q40 is connected to a base of the bipolar transistor Q50. An emitter of the bipolar transistor Q50 is connected to the first terminal of the capacitor C20 and the first terminal of the main control switch 130. A collector of the bipolar transistor Q50 is connected to the output terminal of the power supply protection circuit 120. An input terminal VSYS may be replaced with a high level input via an IO interface.

During normal start, a battery pack that can normally supply power to the tool is connected to the power connection terminal 151. The capacitor C10 is rapidly fully charged (a charging time is on a millisecond level). There is no current between the base and the emitter of the bipolar transistor Q30, and the bipolar transistor Q30 is not turned on. A user of the blower 100 operates the main control switch 130 and switches the main control switch 130 from an off state to an on state. The main control switch 130 is closed. The capacitor C20 starts to be charged. There is a current between the base and the emitter of the bipolar transistor Q40. The bipolar transistor Q40 is turned on, so that there is a current between the emitter and the base of the bipolar transistor Q50. The bipolar transistor Q50 is turned on. The power supply path 200 between the battery pack and the power system 160 is completed. The main control board of the power system 160 is energized. Subsequently, an electrical signal, for example, a +5 V voltage is output to the terminal VSYS of the power supply protection circuit before a charging current of the capacitor C20 fails to keep the bipolar transistor Q40 on, so as to keep the bipolar transistor Q40 on. At this time, if the user operates the main control switch 130 to switch the main control switch 130 from an on state to an off state, the main control switch 130 is opened, the power supply path 200 between the battery pack and the power system 160 is broken, and the tool stops working. Certainly, in this case, the bipolar transistor Q50 and the bipolar transistor Q40 cannot stay on either. The capacitor C20 is discharged through the resistor R60. When the main control switch 130 is closed again next time, the capacitor C20 may be charged again, so as to keep the bipolar transistor Q40 on before the main control board outputs an electrical signal to the terminal VSYS of the power supply protection circuit. During the use by the user, if the power of the battery pack is suddenly interrupted, the blower 100 can no longer work. As a result, the user forgets very easily to open the main control switch 130. Both the capacitor C10 and the capacitor C20 may be discharged through the resistor R60. In this case, the battery pack is replaced, that is, the main control switch 130 is turned on first before an external power source that meets a power supply requirement is connected, and power is supplied to the power supply protection circuit 120 again. In this case, the capacitor C10 and the capacitor C20 are charged at the same time. However, the charging duration of the capacitor C10 is longer than the charging duration of the capacitor C20. Therefore, the bipolar transistor Q30 may be kept in an on state in an entire charging process of the capacitor C20. That is, a charging path of the capacitor C20 starts from an end of the power connection terminal 151 and sequentially includes the main control switch 130, the capacitor C20, the bipolar transistor Q30, the other end of the power connection terminal 151, and a reference level terminal. In this case, there is no current between the emitter and the base of the bipolar transistor Q40, the bipolar transistor Q40 cannot be turned on, the bipolar transistor Q50 cannot be turned on, the power supply path 200 between the battery pack and the power system 160 cannot be completed, and the blower 100 cannot work, so that a protection effect is achieved. In this case, if the user switches the main control switch 130 from an on state to an off state first and is subsequently switched to an on state again, the blower 100 restores normal working. The reason is that when the user switches the main control switch 130 from an on state to an off state first, the capacitor C20 is discharged through the resistor R60, and the capacitor C10 is not discharged. When the main control switch 130 is switched to an on state again, the capacitor C20 is connected to the power supply and starts to be charged. In this case, because the capacitor C10 is not charged, the bipolar transistor Q30 is not turned on, and the charging current of the capacitor C20 enables the bipolar transistor Q40 to be turned on. A subsequent process is the same as a working state during normal start, that is, a working state in which a battery pack that can meet a power supply requirement of the tool is connected to the power supply path 200 before the main control switch 130 is closed.

Figure 5:
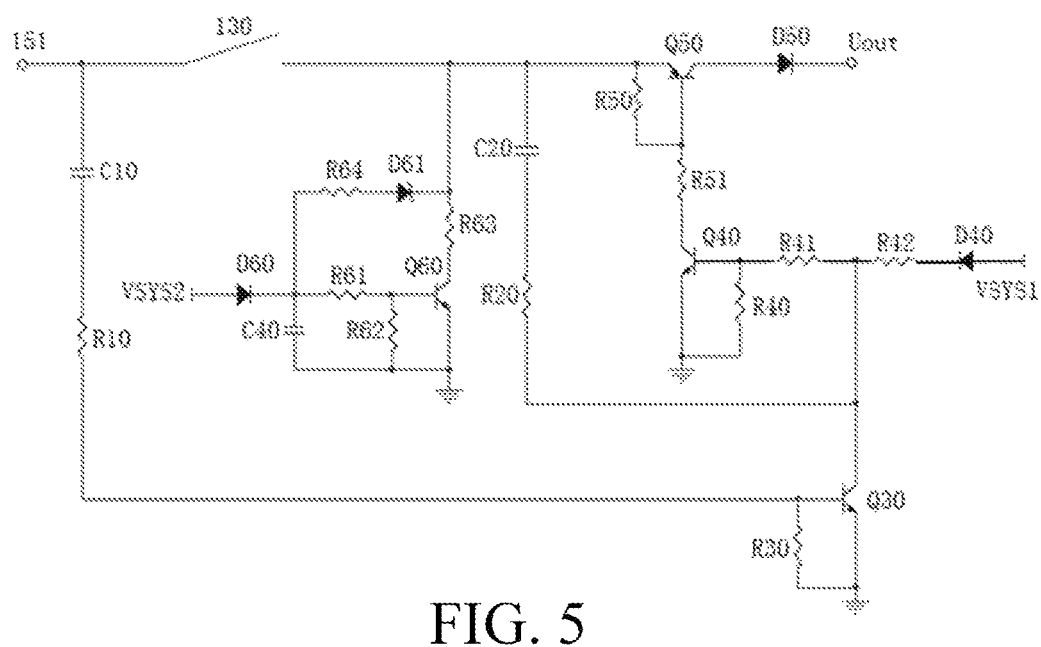
FIG. 5 shows another implementation of an example power supply protection circuit in FIG. 2.

During specific circuit design, peripheral circuits of the circuits and the switches in FIG. 4 may be disposed as shown in FIG. 5, so that the entire power supply protection circuit 120 has a higher or more stable performance.

In an implementation, in the power supply protection circuit 120 in FIG. 5, the power supply start circuit 122 includes the capacitor C20, the power supply switch 121 includes the NPN bipolar transistor Q40 and the PNP bipolar transistor Q50, the power supply blocking circuit 123 includes the capacitor C10, and the blocking switch 124 includes the NPN bipolar transistor Q30. The charging duration of the capacitor C20 is shorter than the charging duration of the capacitor C10. The first terminal of the capacitor C20 is connected to the first terminal of the main control switch 130. The second terminal of the capacitor C20 is connected to the collector of the bipolar transistor Q30 through a resistor R20. The emitter of the bipolar transistor Q30 is connected to the reference level, and is connected to the base of the bipolar transistor Q30 through a resistor R30. The base of the bipolar transistor Q30 is connected to the second terminal of the capacitor C10 through a resistor R10. The first terminal of the capacitor C10 is connected between the power connection terminal 151 and the second terminal of the main control switch 130. The collector of the bipolar transistor Q50 is connected to the power system 160 through a diode D50. The emitter of the bipolar transistor Q50 is connected to the first terminal of the capacitor C20 and the first terminal of the main control switch 130, and is connected to the base of the bipolar transistor Q50 through a resistor R50. The base of the bipolar transistor Q50 is connected to the collector of the bipolar transistor Q40 through a resistor R51. The base of the bipolar transistor Q40 is on one hand connected to the collector of the bipolar transistor Q30 through a resistor R41, and is on the other hand connected to the emitter of the bipolar transistor Q30 through a resistor R40. The emitter of the bipolar transistor Q40 is connected to the reference level. The resistor R41 is connected to the collector of the bipolar transistor Q30 through a resistor R42. The diode D40 is connected to an input terminal VSYS1 of the power supply protection circuit 120. The main control board inputs an electrical signal, for example, a +5 V voltage, to the power supply protection circuit 120 by using the input terminal VSYS1. Both the diode D50 and the diode D40 are disposed to achieve a unique current direction in a respective branch.

During specific design of the power supply protection circuit 120, resistance values of the resistors and/or maximum capacities of the capacitors C10 and C20 and resistance values of corresponding resistors on the branches in which the capacitors C10 and C20 are located on the peripheral circuits of the switches may be set according to a time difference between reception of a Uout signal by the main control board and output of an electrical signal by the input terminal VSYS1, so that the charging duration of the capacitor C10 is longer than the charging duration of the capacitor C20, and on or off of the bipolar transistor Q30 is controlled appropriately.

The power supply protection circuit 120 in FIG. 5 and the power supply protection circuit 120 in FIG. 4 differ in that, for discharge branches of the capacitor C20 and the capacitor C10, the resistor R60 is replaced with a bipolar transistor Q60 and a discharge circuit formed by a peripheral circuit of the bipolar transistor Q60. The first terminal of the capacitor C20 and the first terminal of the main control switch 130 are connected to a collector of the bipolar transistor Q60 through a resistor R63. The collector of the bipolar transistor Q60 is connected to a base of the bipolar transistor Q60 sequentially through the resistor R63, a Zener diode D61, a resistor R64, a resistor R61, and a resistor R62. A cathode of the Zener diode D61 is connected to the first terminal of the capacitor C20, and an anode of the Zener diode D61 is connected to the resistor R64. The base of the bipolar transistor Q60 is connected to an emitter of the bipolar transistor Q60 through the resistor R62. The emitter of the bipolar transistor Q60 is connected to the reference level. A first terminal of the resistor R61 is connected to a first terminal of the resistor R62. A second terminal of the resistor R61 is on one hand connected to a second terminal of the resistor R62 through a capacitor C40, and is on the other hand connected to another input terminal VSYS2 of the power supply protection circuit 120 through a diode D60. The input terminal VSYS2 is connected to the main control board. The Zener diode D61 is disposed to prevent a voltage of the battery pack from being discharged to an excessively low state, that is, from being "drained". If the user switches the main control switch 130 from an on state to an off state, when the capacitor C20 has a relatively high charge, there are two discharge paths. One discharge path sequentially includes the Zener diode D61, the resistor R64, the resistor R61, and the resistor R62. The other discharge path sequentially includes the resistor R63 and the bipolar transistor Q60. When the capacitor C20 has relatively low charge, the input terminal VSYS2 can continue working for a period time depending on the main control board. The capacitor C20 still can continue to be discharged by using the discharge path that includes the resistor R63 and the bipolar transistor Q60, so that the voltage of the capacitor C20 can be rapidly discharged to a relatively low state, and during normal start of the tool, the bipolar transistor Q40 can be turned on normally, and the main control board can be powered up normally. Both the input terminal VSYS1 and the input terminal VSYS2 may be replaced with high levels input via an IO interface.

In the foregoing implementation, the power supply start circuit 122 and the power supply blocking circuit 123 may use the same discharge branch or respective discharge branches may be disposed for the power supply start circuit 122 and the power supply blocking circuit 123.

The foregoing shows and describes basic principles, major features, and advantages of the technical solution herein described. A person skilled in the art should understand that the foregoing examples are not intended to limit the invention that is claimed in any form. Rather, all technical solutions obtained by using equivalent replacements or equivalent variations are intended to fall within the protection scope of invention claimed.

What is claimed is:
1. A power tool, comprising:
a power connection terminal, used for connection to a power source, comprising a power supply interface;
a power system;
a power supply path disposed between the power system and the power supply interface to enable the external power source to supply power to the power system via use of the power supply interface;
a main control switch, disposed on the power supply path between the power system and the power supply interface, wherein the power supply path is completed only when the main control switch is in an on state;
a power supply protection circuit, connected to the power supply path, configured to break the power supply path between the power system and the power supply interface when the power tool is used according to a protection operation order, wherein the protection operation order comprises turning on the main control switch first and then connecting an external power source that meets a power supply requirement to the power connection terminal
wherein the power supply protection circuit comprises:
a power supply switch, disposed on the power supply path between the power system and the power supply interface, wherein the power supply path is completed only when the power supply switch is in an on state;

a power supply start circuit configured to send a first control signal for controlling the power supply switch to be turned on;

a blocking switch, capable of blocking the first control signal when turned on; and a power supply blocking circuit configured to send to the blocking switch when the power tool is used in a first operation order a second control signal for controlling the power supply switch to be turned on;

wherein the power supply blocking circuit comprises a first capacitor, the first capacitor is connected to the power connection terminal, the first capacitor is in a charging state when the power tool is used in the protection operation order, and the first capacitor is configured to send the second control signal for controlling the blocking switch to be turned on to the blocking switch when in the charging state wherein the power supply blocking circuit further comprises a first discharge branch, and the first capacitor and the first discharge branch are connected when the main control switch is closed;

wherein the power supply start circuit comprises a second capacitor, the second capacitor is connected to the power connection terminal when the main control switch is closed, and the second capacitor is configured to send the first control signal for controlling the power supply switch to be turned on to the power supply switch when in the charging state, and wherein a first terminal of the second capacitor is connected to the main control switch, a second terminal of the second capacitor is connected to a control terminal of the power supply switch and connected to a first terminal of the blocking switch, a second terminal of the blocking switch is connected to a reference level, the first terminal and the second terminal of the blocking switch are connected when the blocking switch is turned on, and a control terminal of the blocking switch is connected to the power supply blocking circuit.

2. The power tool according to claim 1, wherein the blocking switch comprises a first bipolar transistor, the control terminal of the blocking switch is connected to a base of the first bipolar transistor, the first terminal of the blocking switch is connected to a collector of the first bipolar transistor, and the second terminal of the blocking switch is connected to an emitter of the first bipolar transistor.

3. The power tool according to claim 1, wherein the power supply switch comprises a second bipolar transistor and a third bipolar transistor, the control terminal of the power supply switch is connected to a base of the second bipolar transistor, an emitter of the second bipolar transistor is connected to the reference level, the base of the second bipolar transistor is connected to a base of the third bipolar transistor, and an emitter and a collector of the third bipolar transistor are disposed on the power supply path between the power system and the power supply interface.

4. The power tool according to claim 1, wherein charging duration of the first capacitor is longer than a charging duration of the second capacitor.

5. The power tool according to claim 1, wherein the power supply start circuit comprises a second discharge branch.

* * * * *

UNITED STATES PATENT AND TRADEMARK OFFICE
CERTIFICATE OF CORRECTION

PATENT NO. : 10,742,053 B2
APPLICATION NO. : 16/186887
DATED : August 11, 2020
INVENTOR(S) : Dezhong Yang, Haiyan Li and Weipeng Chen Page 1 of 1

It is certified that error appears in the above-identified patent and that said Letters Patent is hereby corrected as shown below:

On the Title Page

(73) Assignee: Nanjing Chevron Industry Co., Ltd. should read Nanjing Chervon Industry Co., Ltd.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*